United States Patent [19]
Bright

[11] 3,876,085
[45] Apr. 8, 1975

[54] AUTOMATED STORAGE SYSTEMS AND APPARATUS THEREFOR

[76] Inventor: Thomas John Robert Bright, 270 Sandridge Rd., Rockcliffe Park, Ottawa, Ontario, Canada

[22] Filed: July 14, 1972

[21] Appl. No.: 271,767

Related U.S. Application Data

[63] Continuation of Ser. No. 16,837, March 5, 1970, abandoned.

[52] U.S. Cl. .................................. 214/16.1 CC
[51] Int. Cl. ............................................. E04h 6/06
[58] Field of Search .. 214/16.1 CC, 16.1 C, 16.4 A, 214/16 B, 16.1 B

[56] References Cited
UNITED STATES PATENTS

| | | | |
|---|---|---|---|
| 1,969,419 | 8/1934 | Martin | 214/16.1 CC |
| 2,685,260 | 8/1954 | Auger | 214/16.1 CC |
| 2,837,224 | 6/1958 | Rosen | 214/16.1 CE |
| 3,132,753 | 5/1964 | Chasar et al. | 214/16.21 A |
| 3,190,467 | 6/1965 | English | 214/16.1 CE |
| 3,206,041 | 9/1965 | McGrath | 214/16.4 A |

FOREIGN PATENTS OR APPLICATIONS

| | | | |
|---|---|---|---|
| 24,397 | 4/1883 | Germany | 187/25 |
| 584,418 | 10/1958 | Italy | 214/16.1 B |

*Primary Examiner*—Robert J. Spar
*Assistant Examiner*—R. R. Johnson
*Attorney, Agent, or Firm*—Depaoli & O'Brien

[57] ABSTRACT

Mechanism for imparting motion to a movable member such as a vehicle comprises a plurality of channels and a rotatable member such as a chain or vane having a peg, pin or roller arranged to engage in the channels to propel the vehicle along a track. The channels may be on the vehicle and the rotatable member on the track or vice versa, and the channels and rotatable member may be arranged to move the vehicle horizontally or vertically. The invention is used particularly in connection with a load storage and retrieval system for imparting lineal motion to a vehicle such as a carrier member arranged to traverse a track and for imparting transverse movement to load carrying members such as pallets, such as to transfer the pallets from the carrier member to a load storage location adjacent the track, or vice versa.

3 Claims, 22 Drawing Figures

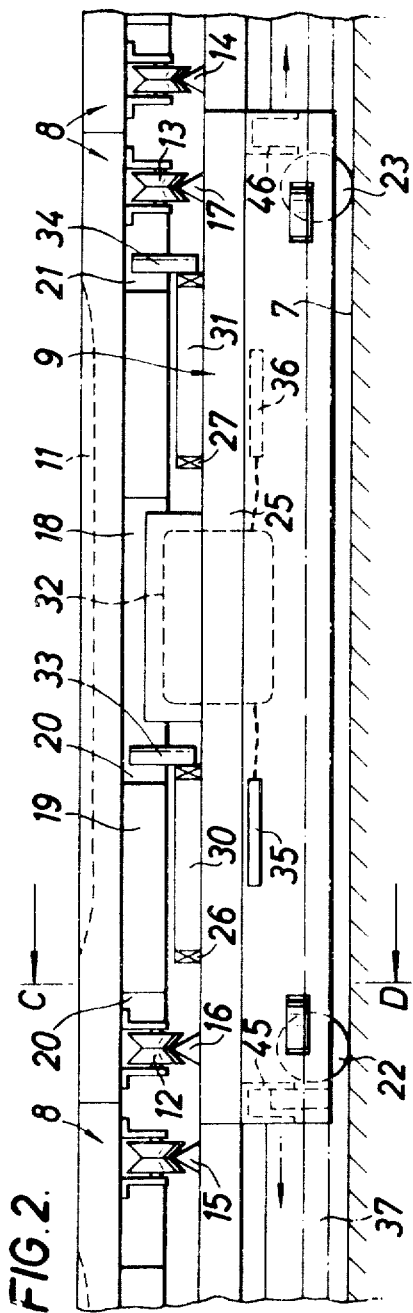
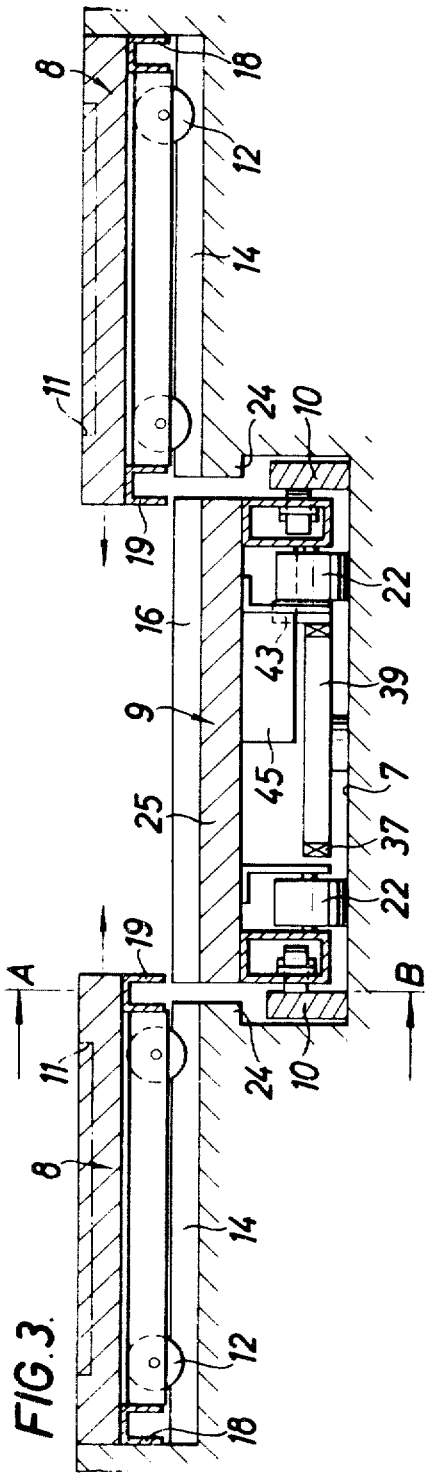
FIG.2.
FIG.3.

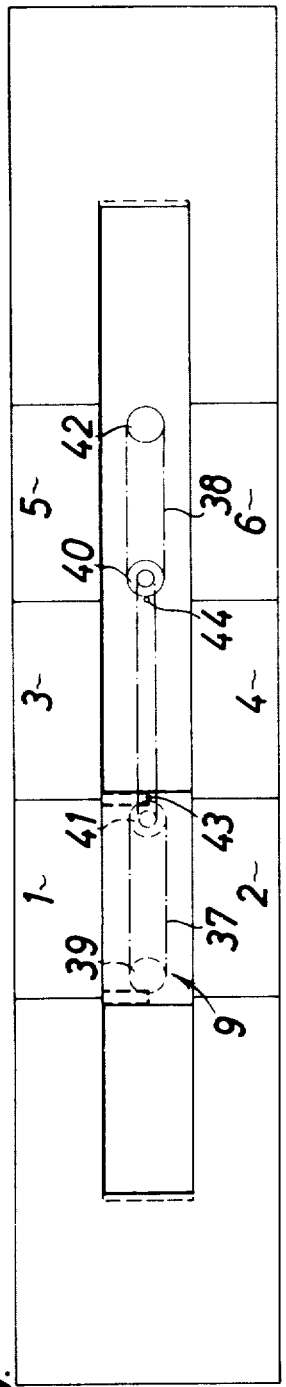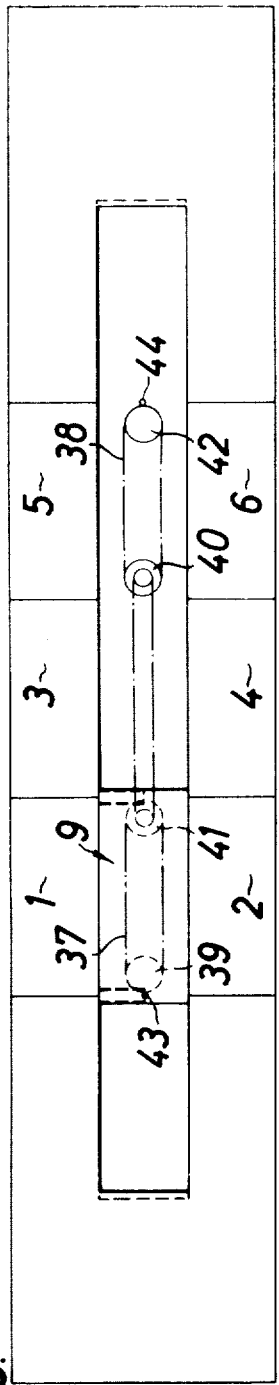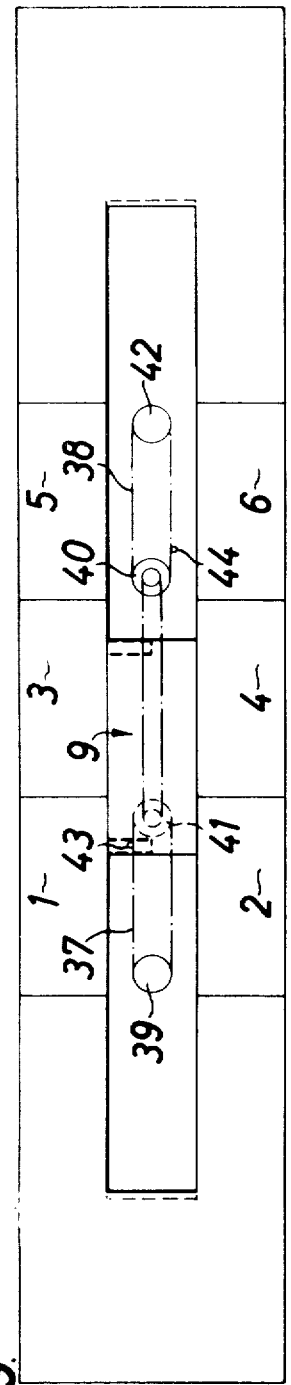

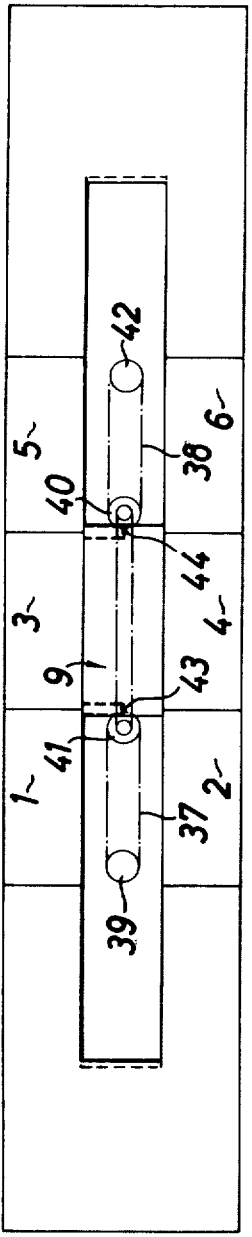
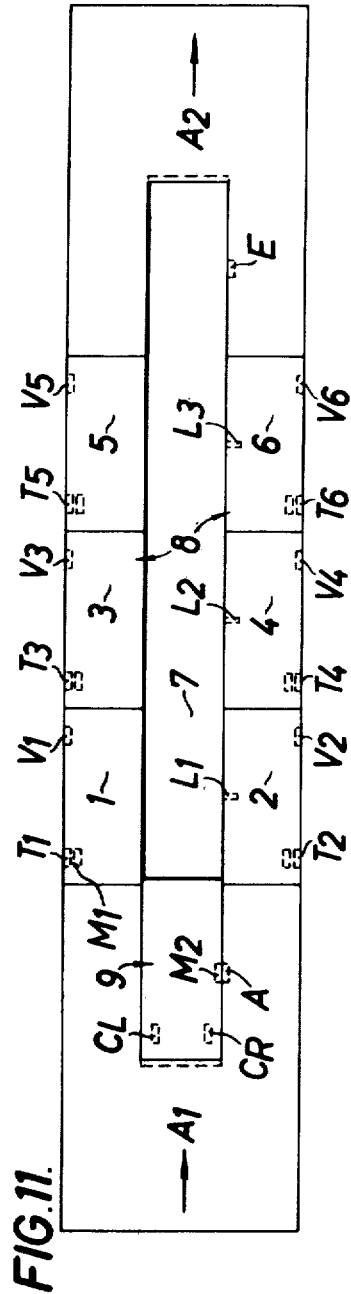
FIG.10.
FIG.11.

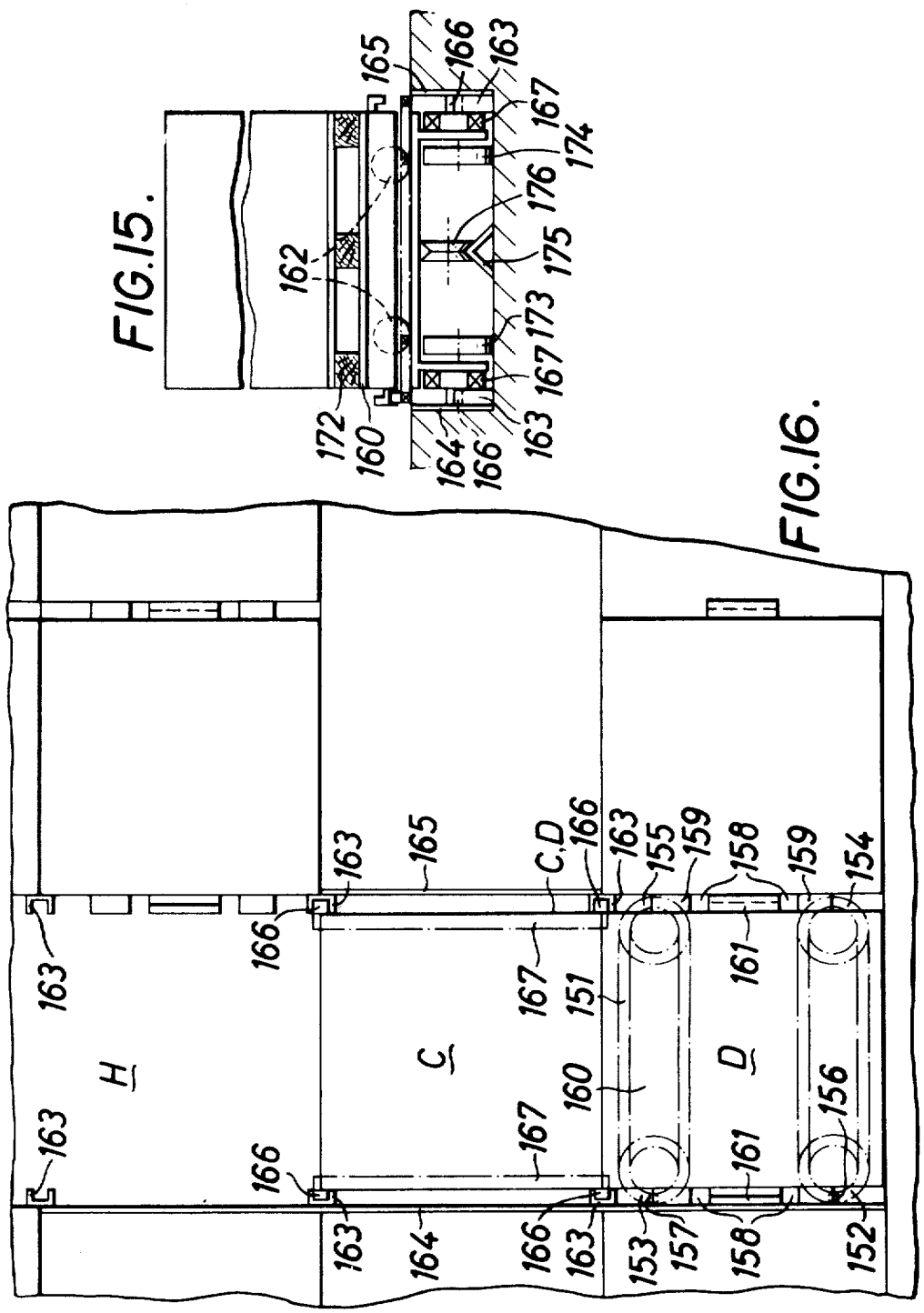

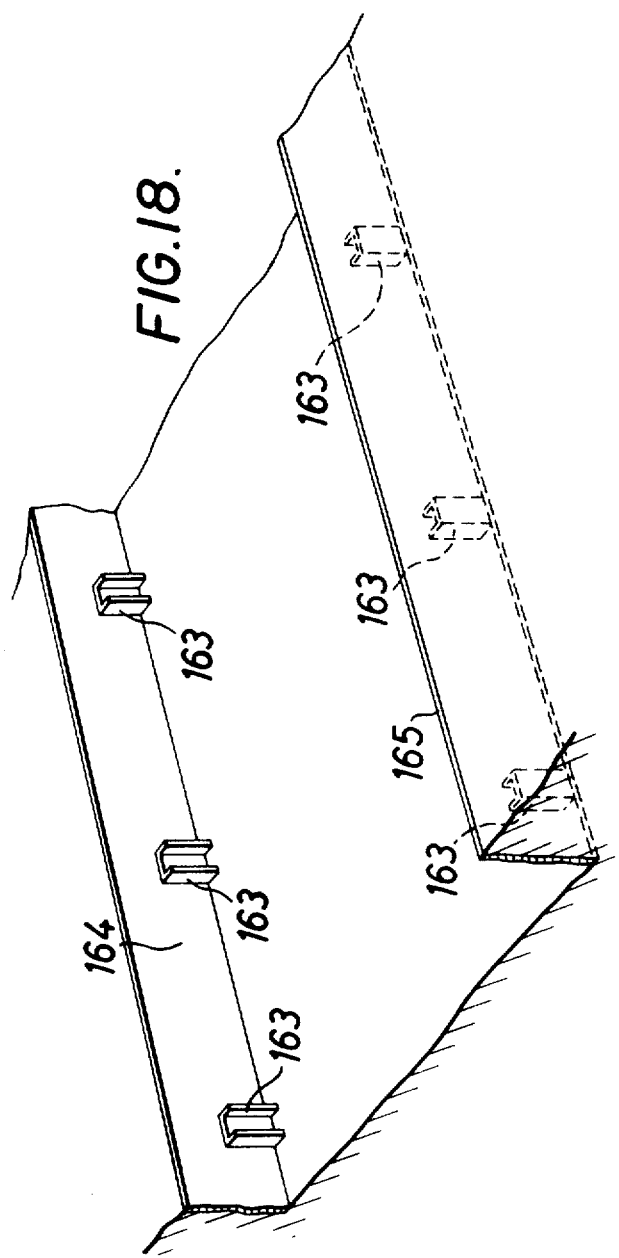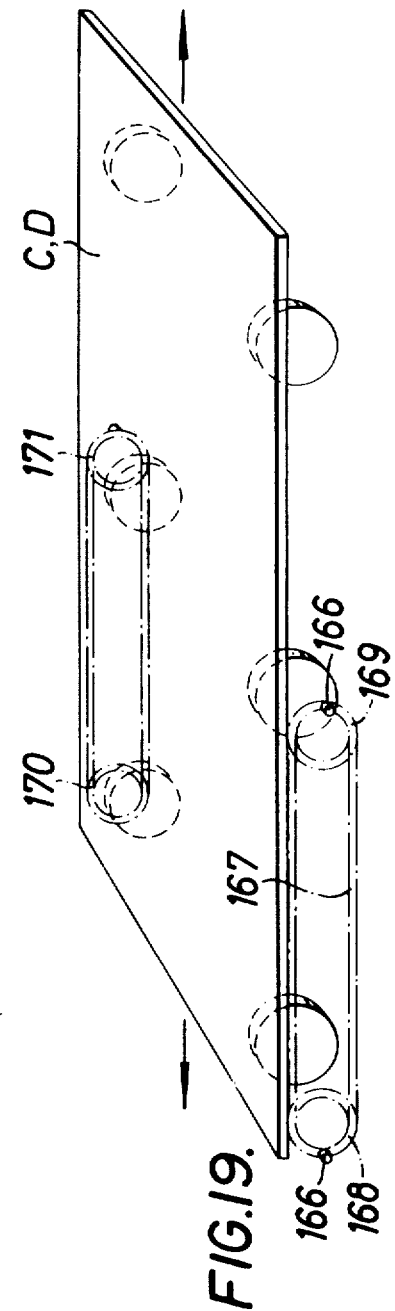

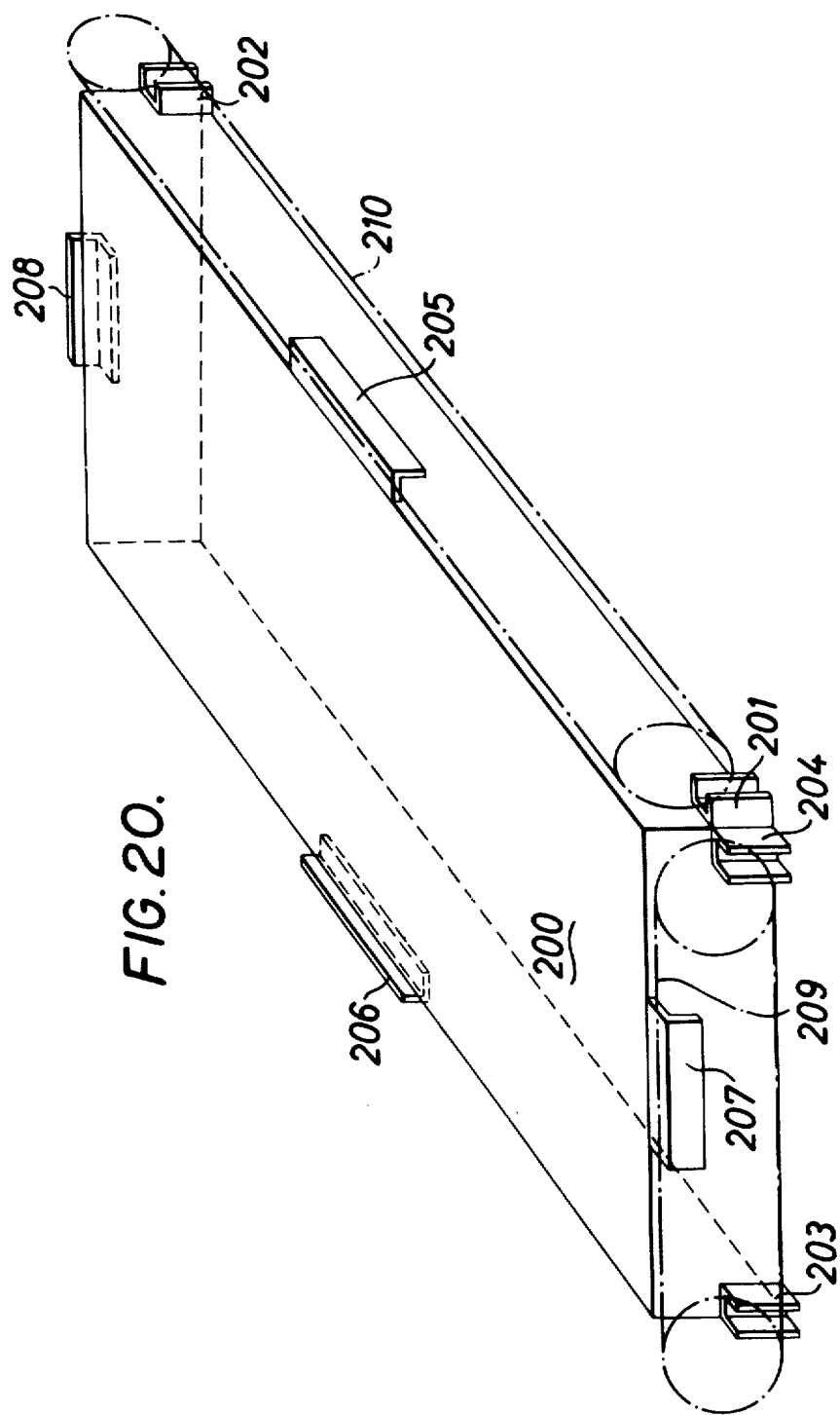

INVENTOR
THOMAS JOAN ROBERT BRIGHT
BY
ATTORNEY

3,876,085

AUTOMATED STORAGE SYSTEMS AND APPARATUS THEREFOR

RELATED APPLICATIONS

This application is a continuation of application Ser. No. 16,837, filed Mar. 5, 1970, now abandoned.

This invention relates to an automated load storage and retrieval system and apparatus therefor and is applicable to the storage and retrieval of all kinds of goods and loads such as goods stored on pallets in warehousing structures, vehicles in a car parking complex, containers in a containerisation system and any kind of unit which can be stored and retrieved from storage in accordance with specific requirements.

One embodiment of the present invention is concerned with a load storage and retrieval system of the kind in which loads are stored on pallets, or in containers or the like located within a plurality of storage locations arranged on one or both sides of an aisle or track, the loads being placed in storage from a delivery point or the loads being retrieved from storage for delivery to a dispatch point or other location. Alternatively, the loads may be delivered to or retrieved from rail heads, docks, warehouses, wharves or other load handling centres.

In my U.S. Pat. No. 3,554,389, there is described an automated load storage and retrieval system in which a plurality of load storage locations are arranged on one or both sides of an aisle or track and extend along the length thereof and in which loads, such as vehicles located on pallets are arranged to be stored in any of said storage locations and withdrawn therefrom and dispatched to a delivery point via an aisle or track. A load supporting pallet is provided for each storage location and a carrier member is provided for conveying a load supporting pallet and load supported thereby from or to any selected storage location. Lineal driving means are provided for driving the load carrier member in either direction along the track and transverse driving means are provided for transferring a load supporting pallet and associated load from the carrier member to a selected storage location or vice versa.

An object of the present invention is to provide a load storage and retrieval system which utilises a modified form of lineal driving means.

A further object of the invention is to provide a load storage and retrieval system which utilises a modified form of lineal and/or transverse driving means.

A still further object of the invention is to provide a modified form of lineal driving means which allows a vehicle such as a hoist or carrier member to be moved in a horizontal and/or vertical direction.

Another object of the present invention is to provide a modified form of lineal driving means wherein a 'ladder rack' is carried by the vehicle or located on means separate from the vehicle and arranged such as to be engaged by rotary means located on said separate means or on the vehicle respectively.

According to one aspect of the invention, there is provided means for imparting lineal motion to a vehicle including first driving means comprising a plurality of spaced channels and second driving means comprising at least one driven rotary member having at least one drive member arranged to rotate therewith and to engage in the channels of the first driving means, and the first and second driving means being respectively mounted on the vehicle and on a surface adjacent the vehicle, or vice versa, to permit the vehicle to be impelled over or past the surface when the first and second driving means are in driving engagement.

According to a further aspect of the invention, there is provided in addition to the lineal motion means described above, mechanism including third driving means comprising a further at least one channel extending in a direction normal to the direction in which said at least one channel of said first driving means extends and fourth driving means including a further at least one driven rotatable member having a further at least one coupling member arranged to rotate therewith and to engage in the further at least one channel of the third driving means, one of the third and fourth driving means being mounted on the movable member and the other of said third and fourth driving means being located on means adjacent the movable member to permit relative movement between the movable member and said adjacent means in a direction normal to the direction in which the movable member is impelled in response to driving engagement of said first and second driving means, when a said further coupling member of the fourth driving means is in driving engagement with a said further channel of the third driving means.

According to a still further aspect of the invention, there is provided a load storage and retrieval system comprising at least one load storage unit, the or each unit having at least one row of load storage locations, a load supporting member for each storage location, a carrier member for conveying a load supporting member and load supported thereby from or to a selected storage location, lineal driving mechanism including first driving means comprising at least one channel and second driving means comprising at least one driven rotatable member having at least one coupling member rotatable therewith and engageable in the said at least one channel of the first driving means, one of the driving means being mounted on the carrier member and the other of the driving means being separate from the carrier member to impart motion to the carrier member when a coupling member of the second driving means is in driving engagement with a channel of the first driving means, and transverse driving mechanism including further driving means consisting of a third driving means comprising at least one channel and fourth driving means comprising at least one driven rotatable member having at least one coupling member rotatable therewith and engageable in the said at least one channel of the third driving means, one of the further driving means being mounted on the carrier member and the other of said further driving means being located on the load supporting members for transferring a load supporting member in a direction transverse to the direction of travel of the carrier member from the carrier member to a selected storage location, or vice versa when a channel and coupling member of the third and fourth driving means are in driving engagement.

In one embodiment of the invention applicable to the storage and retrieval of vehicles, a plurality of vehicle storage locations are arranged in equispaced relationship on either side of a sunken track along which is arranged to travel a high speed carrier member capable of conveying pallets used for supporting the vehicles from an entrance point to a selected empty storage location or from a selected occupied storage location to an exit point. Each vehicle required to be stored in any selected storage location of the unit, is driven onto, or placed on a wheeled pallet and the carrier member is arranged to be driven by the lineal driving means to convey the pallet and vehicle supported thereby to a selected vehicle storage location on one side or other of the track. The carrier member is arranged to halt at precisely opposite the selected storage location where transverse driving means are actuated to transfer the pallet and vehicle supported thereby in a direction normal to the direction of travel of the carrier member, such as to locate the pallet and vehicle in the selected storage location. The reverse sequence of operations is performed to transfer a vehicle and pallet from a selected storage location on to the carrier member for dispatch to an exit point of the unit.

The lineal driving mechanism comprises rotary means such as one or more driving chains located in the well of the track together with one or more chain wheels. The or each chain is provided with an upstanding pin, peg or roller arranged to engage in offset channels provided on each end of the carrier member. Alternatively, the rotaty means may comprise a pair of contra-rotating vanes mounted on the carrier member and having dependent rollers at each end arranged to engage in spaced channels in the track such as to propel the carrier member along the track. (Such series of spaced channels will hereinafter be referred to as a 'ladder rack'). The rotary means such as the chains or vanes may be mounted on the carrier member or on the track and the channels may be provided on the track or on the carrier member respectively. Furthermore, the rotary means and channels of the lineal driving mechanism may be so arranged as to allow the carrier member to be moved in a horizontal or vertical direction. Thus, the rotary means such as the driving chain or chains and associated chain wheel or wheels or the rotary vanes may be mounted on the carrier member and the channels or 'ladder rack' provided on a horizontal or vertical surface over which or past which the carrier member is impelled when a pin, peg or roller on a chain or vane is in engagement with a channel. Alternatively, the channels may be arranged horizontally or vertically on the carrier member and the rotary means arranged on a vertical or horizontal surface for movement of the carrier member in a vertical or horizontal plane.

By mounting the 'ladder rack' in a vertical plane, the carrier member may be propelled in a horizontal or vertical plane and the carrier member could be a hoist or elevator/lowerator or any other device capable of moving vertically in an upward or downward direction.

The transverse driving mechanism may be similar to the lineal driving mechanism and comprises rotary means such as one or more endless chains mounted on the carrier member and driven from a respective chain wheel in turn rotatably driven by electric motor means mounted on the carrier member. The or each chain is provided with a pin or peg or roller arranged to engage in a channel provided on the pallet in order to move the pallets in a transverse direction from or to a storage location to or from respectively, the carrier member.

The carrier member and pallets may be arranged during movement thereof to effect actuation of various control members such as bi-state devices and logic circuitry is provided which recognises the state of the bi-state members such as to control the lineal and transverse driving mechanism and consequently the movement of the carrier member and pallets.

The invention will now be described with particular reference to a vehicle storage and retrieval system but as previously indicated, the invention is in no way limited to such a specific application and is applicable to the storage and retrieval from storage of any kind of load. For instance, the invention may be used for loading pallets, containers or like units from, for example, a railway wagon, dockside or any other location and the first and second driving means of the mechanism according to the invention may be used for loading or unloading any such load on to or from respectively any moving or stationary surface.

The invention will now also be described with particular reference to the accompanying drawings, wherein:

FIG. 2 is a longitudinal section of the unit taken along the line A–B of FIG. 3 which is a cross-sectional view taken along the line C–D of FIG. 2;

Figure 12:
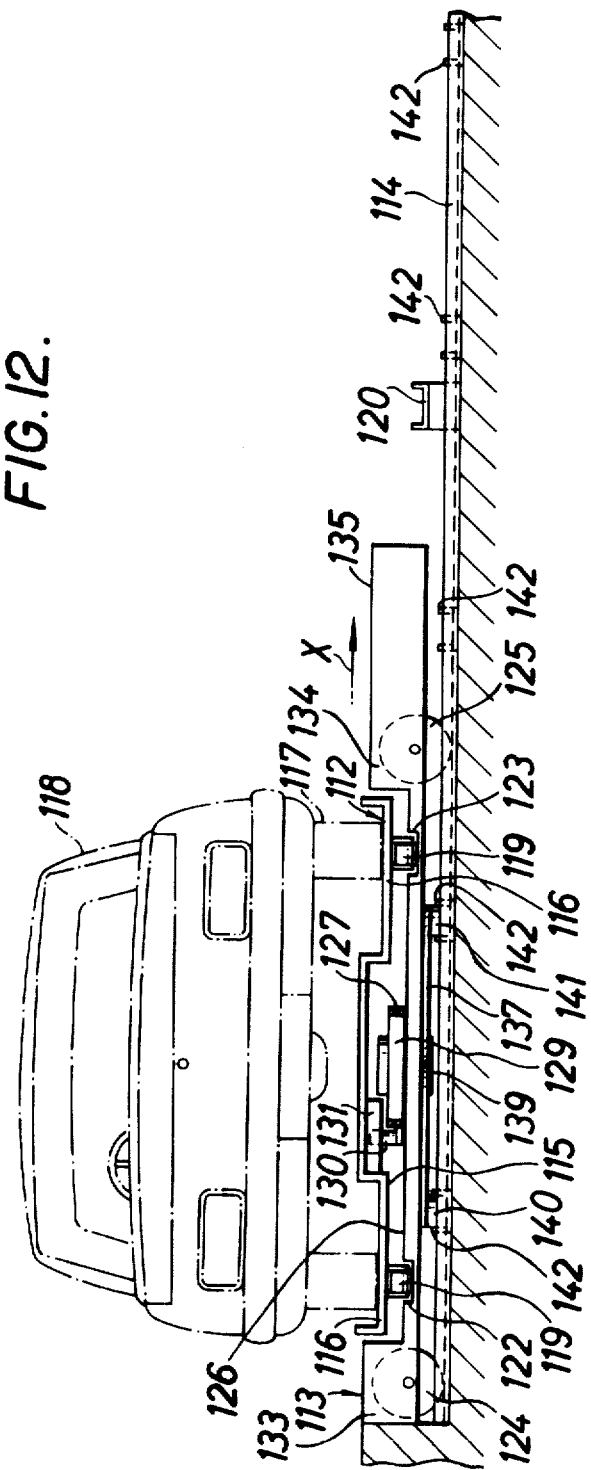
Figure 13:
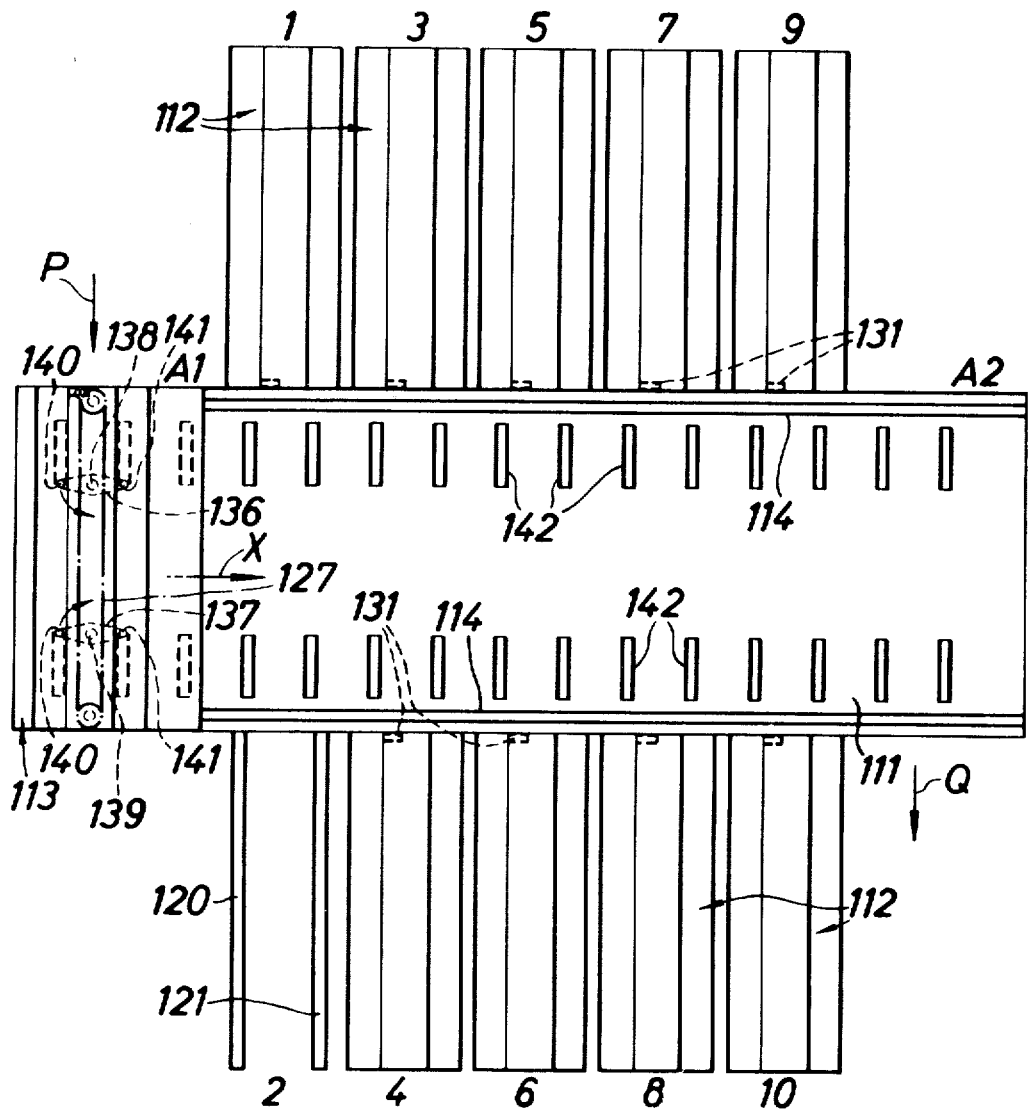
Figure 14:
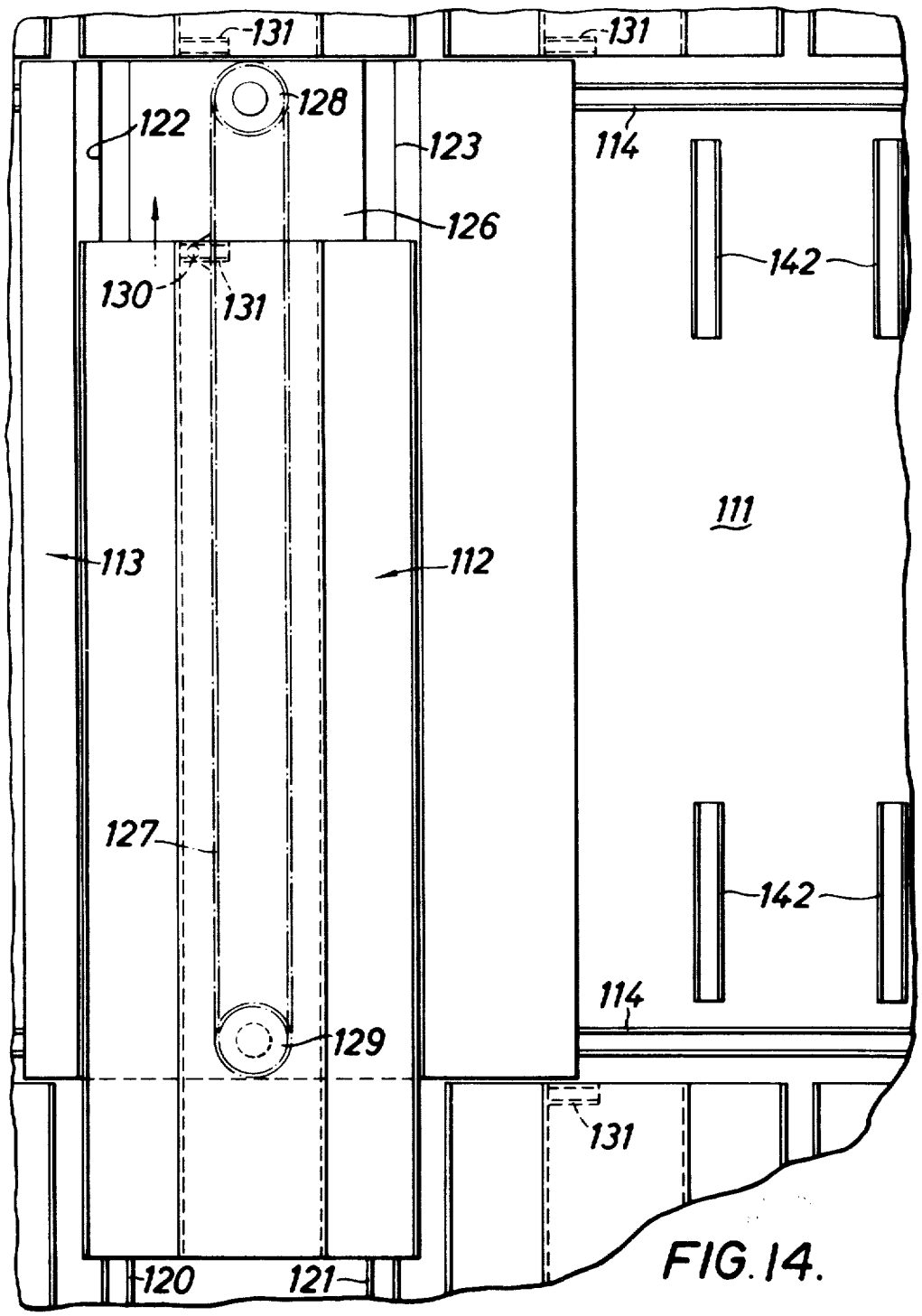
Figure 17:
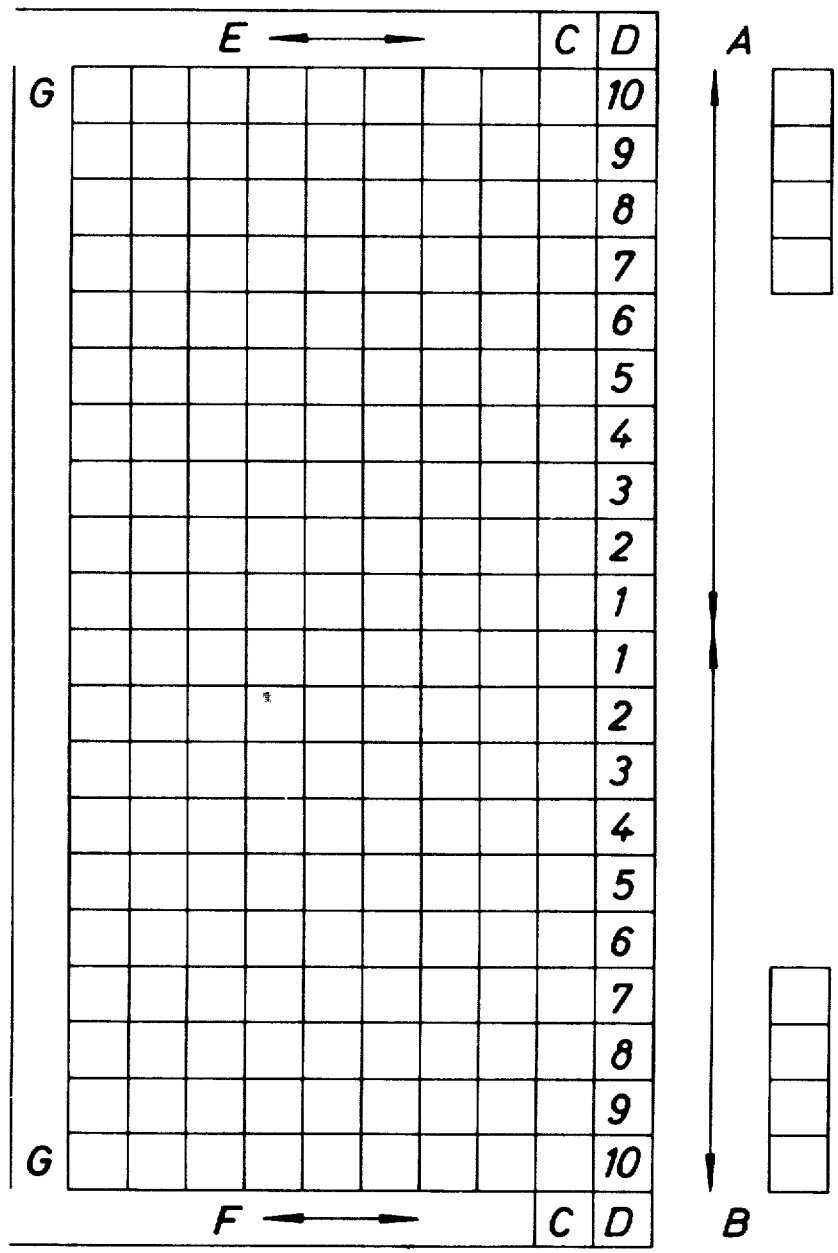
Figure 22:
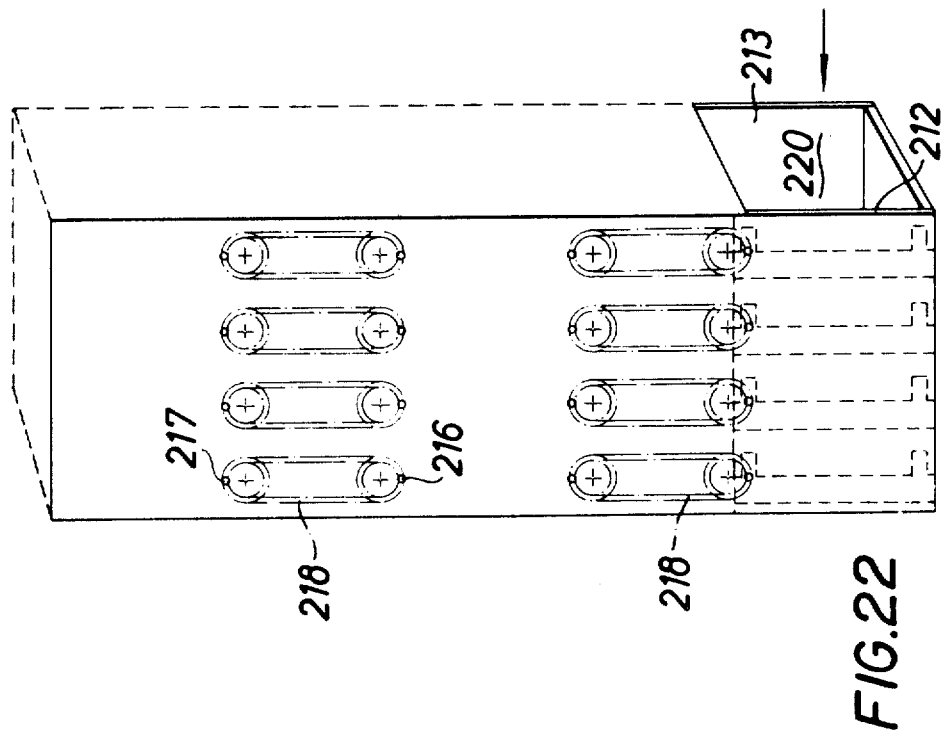
Figure 21:
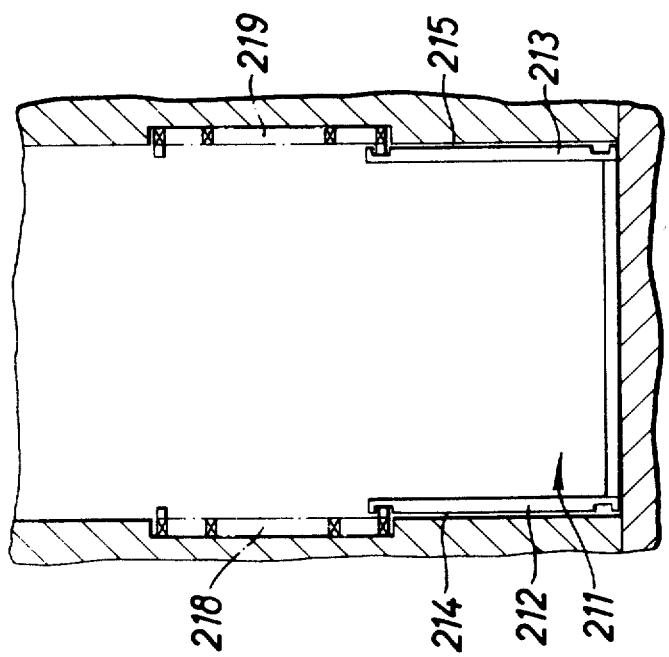

FIGS. 4–10 inclusive, illustrate the sequential steps involved in the propulsion of the carrier member along the track by means of the lineal driving mechanism;

FIG. 11 is a diagrammatic view of the unit illustrating the positions of magnets and reed switch contacts for the control of the transverse and lineal driving mechanisms;

FIG. 12 is a side elevational view of part of a storage unit showing a vehicle in position on a pallet located on a carrier member;

FIG. 13 is a plan view of a ten vehicle storage unit;

FIG. 14 is a plan view of part of the storage unit with one pallet partly withdrawn from storage;

FIG. 15 is a end view of part of a load storage and retrieval area of a warehousing complex;

FIG. 16 is an top plan view of the area of FIG. 15;

FIG. 17 is a schematic diagram of the warehousing storage area;

FIG. 18 is a perspective diagrammatic view of a part of the track showing vertical 'ladder racks' provided in the vertical walls of the well of the track;

FIG. 19 is a perspective view of a carrier member having the lineal drive mechanism mounted thereon for engagement with the vertical 'ladder rack' of FIG. 18;

FIG. 20 is a perspective view of part of a carrier member showing the stationary part of the transverse and lineal driving mechanism mounted on the carrier member;

FIG. 21 is a side elevation of a hoist using vertically mounted lineal driving mechanism; and FIG. 22 is a perspective view of the well of the hoist of FIG. 21.

Figure 1:
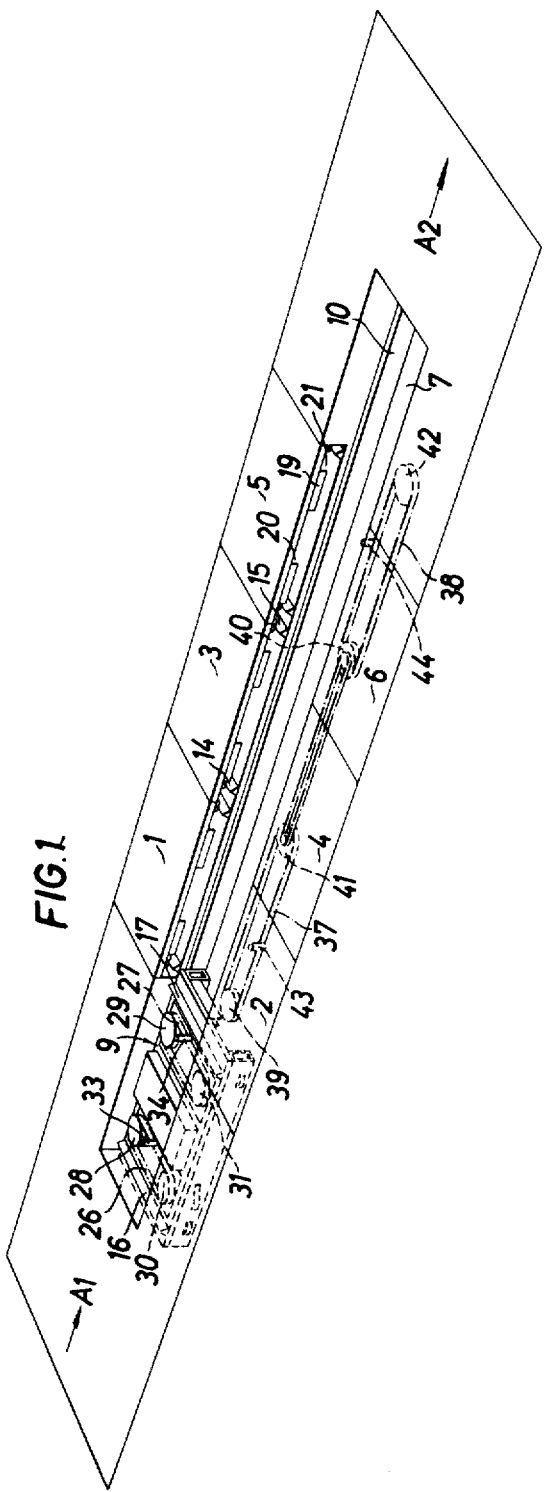
FIG. 1 is a diagrammatic perspective view of a 6 vehicle storage and retrieval unit with chain drives for lineal and transverse movement of the carrier member and pallets.
Figure 4:
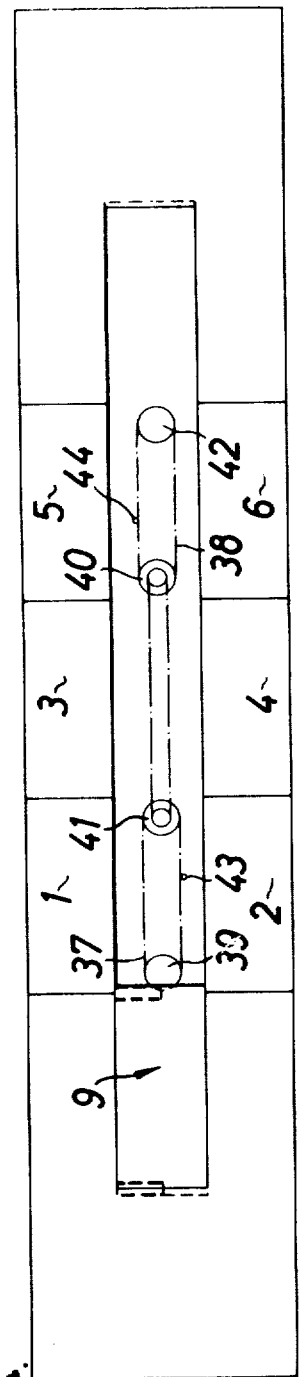
Figure 5:
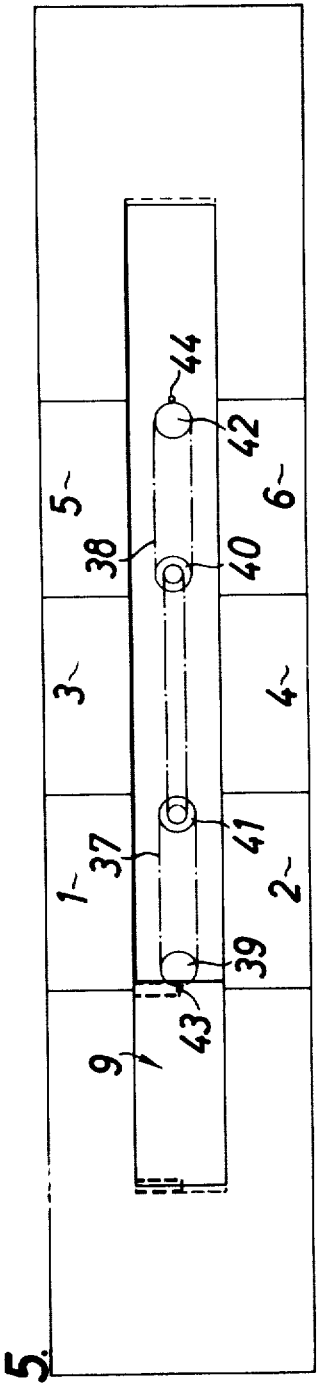
Figure 6:
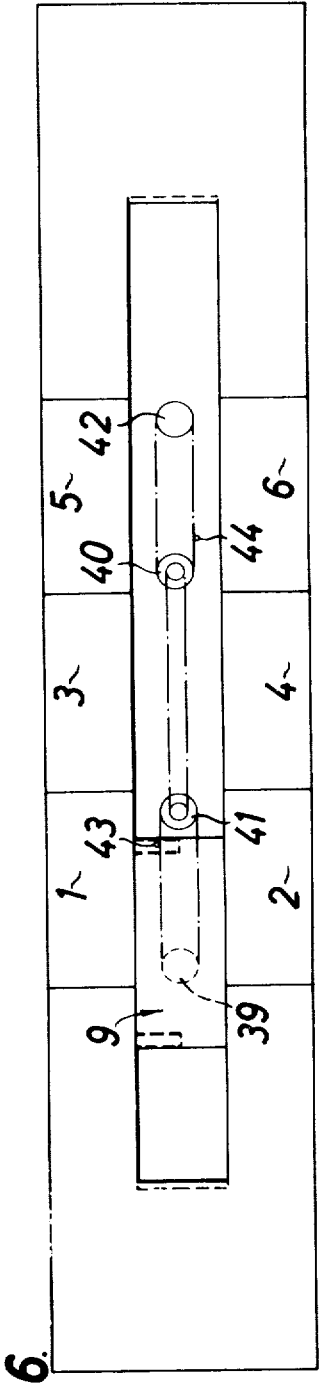

Referring initially to FIGS. 1 to 3 of the drawings, a six vehicle storage and retrieval unit is shown although it will be appreciated that in practice, the unit would accommodate considerably in excess of six vehicles on one level. The unit includes the six vehicle storage locations 1 to 6 arranged in two rows on either side of the central track 7. Wheeled pallets 8 are arranged in each storage location and a carrier member 9 is arranged to run between guide rails 10 provided in the sunken well or track 7 between an entrance point A1 and an exit point A2.

Each pallet 8 comprises a flat surface of sheet metal or the like having spaced guide tracks 11 thereon serving to position a vehicle centrally on the pallet, but it will be appreciated that the pallets may be of any suitable construction and may be constructed as shown in FIG. 8 of U.S. Pat. 3,554,389. Two paris of transversely-mounted wheels 12, 13, are provided on each pallet 8 and ar arranged to run on parallel rails 14, 15, provided in each storage location and on parallel rails 16, 17, provided on the carrier member 9. However, it will be appreciated that any number of wheels may be provided on each pallet 8 which is capable of transverse movement from a vehicle storage location position on to the carrier member 9, and is provided along one edge with a skirt 18 depending therefrom and arranged to locate against an upstanding projection (not shown) on the carrier member 9 to prevent any pallet 8 from travelling beyond the edge of the carrier member remote from the storage location from which a pallet has been moved. The other edge of each pallet 8 is provided with a chanelled skirt 19 having openings 20, 21 therein through which pins of the transverse driving means are arranged to pass as will be hereinafter described. Each pallet is also provided with a magnet M1 for controlling the movement thereof as will be hereinafter described. No. Two pairs are The carrier member 9 is arranged to run in a well 7 on wheels 22, 23 and is guided by the guide rails 10 located beneath overhanging ledges 24 of the track. However, it will be appreciated that the carrier member 9 may be provided with any number of wheels. The surface 25 of the carrier member 9 is arranged to lie substantially flush with the surfaces of the storage locations 1 to 6 with the rails 16, 17 on the carrier member at the same level as the rails 14, 15 of each storage location and such as to be aligned therewith whenever the carrier member is located opposite the respective storage location. The transverse driving means mounted on the carrier member comprises a pair of endless chains 26, 27 driven from a respective driven chain wheel 28, 29, and passing around a respective idler wheel 30, 31; the driven chain wheels being arranged to be rotatably driven by means of an electric motor 32 mounted on the carrier member 9. Each chain 26, 27 is provided with a respective peg or pin 33, 34 which are arranged to pass through the gaps 20, 21, in the skirt 19 of a pallet and to pass along the channel thereof in order to move the pallets 8 in a transverse direction as will be hereinafter described. Current from the electric motor 32 is provided via pick-up contacts 35, 36 during passage of the carrier member along the track 7. A pair of encapsulated reed switch contact members $C_L$, $C_R$ are provided on one end of the carrier member 9 and the contacts thereof are arranged to be actuated by the magnets M1 of the pallets in order to control the movement of the carrier member as will be hereinafter described. The carrier member 9 may be constructed as shown in FIG. 9 of U.S. Pat. No. 3,554,389.

A magnet M2 is arranged transversely on the carrier member and is arranged to control the actuation of encapsulated reed switch contacts $L_1$, $L_2$, and $L_3$ arranged along one wall of the well 7 at storage location positions 2, 4 and 6 as shown. As shown in FIG. 11, further reed switch contacts $T_1$ to $T_6$ and $V_1$ to $V_6$ are arranged in respective storage locations 1 to 6, the contacts $T_1$ to $T_6$ being arranged to be actuated by the magnets M1 on the pallets 8 and the contacts $V_1$ to $V_6$ being used to sense the presence of a vehicle on a pallet. Further reed switch contacts A and E are arranged at the entrance and exit ends A1, A2 respectively, of the track 7 and the operation of all the reed switch contacts and motor contacts will be described hereinafter when the logic and sequence of operations is discussed.

The lineal driving means for driving the carrier member 9 in either direction along the track 7 comprises a further pair of driving chains 37, 38 located in the well 7 together with a pair of driven chain wheels 39, 40 and a pair of idler chain wheels 41, 42. As with the transverse driving means, each chain 37, 38 is provided with a respective upstanding driving pin or peg 43, 44 arranged to engage in offset channel members 45, 46, provided at the front and rear of the carrier member 9. The two chain drives for the lineal driving means are arranged opposite storage locations 1,2 and 5,6 with a connecting chain therebetween if required. As shown in FIGS. 4 to 10, the two chain drives are so arranged that when for instance the carrier member 9 is located at the loading position A1 beyond locations 1 and 2, the driving pin 44 is capable of entering front channel 45 when the chain wheel 40 is rotated by energisation of the driving means therefor. Since the ends of the channels are arranged in line with the centres of the chain wheels, then as soon as the driving pin 44 enters channel 45, it pulls the carrier member 9 from the loading position A1 towards locations 1, 2. The end of each channel by which the pin enters and leaves the channel is always aligned with the centre of the respective chain wheel. The length of the chain 38 and the length of the channel 45 are such that when the carrier member has been moved opposite locations 1, 2 the pin 44 is about to become disengaged from channel 45. When this occurs, the carrier member 9 will become momentarily stationary until the chain 38 has rotated by a sufficient amount to bring the driving pin 44 into a position to enter the rear channel 45 of carrier member 9. The pin 44 is now able to exert a pushing force on the carrier member such as to continue the propulsion of the carrier member 9 along the track 7 in the direction of A2. When the pin 44 rides out of channel 46, the carrier member 9 is located opposite locations 3,4 and in this position, the front channel 45 is capable of receiving driving pin 43 on chain 37. When chain 37 has been rotated sufficiently to allow pin 43 to enter channel 45, the process described above is repeated, i.e., pin 43 pulls the carrier member from locations 3,4 to locations 5,6 by engagement in channel 45 and pushes the carrier member from locations 5,6 to the delivery position A2 by engagement of pin 43 in channel 46.

A similar driving arrangement is provided on the carrier member in order to achieve the transverse movement of the pallets from the carrier member 9 to a selected storage location or vice versa. As previously briefly described. two driving chains 26,27 are provided on the carrier member, one for performing a loading operation and the other, for an unloading operation according to the direction of rotation of the chains. The driving pins or pegs 33,34 are arranged to pass through gaps 20, 21, in the channelled skirt 19 on the pallets and to emerge via the same gaps. Whilst the moving pin 33 or 34 is trapped within the channel, the rotation of the chain causes a transverse movement of the pallet towards or away from the carrier member according to whichever pin is located within the channel.

The automated operation of the unit, i.e., the movement of the carrier member and the movement of any pallet is under the control of logic circuitry arranged such as to allow the carrier member 9 to search from any specific storage location and to remove a pallet or pallet and vehicle therefrom and to convey these to the entrance or exit points respectively, or place a pallet and vehicle within the nearest storage location. Thus, in order to collect an empty pallet from location 1, bring the pallet to entrance point A1, load the pallet with a vehicle and return the pallet together with load to storage location 1, the sequence of operations under the control of the basic logic of the circuit is as follows:

A control button is depressed to start the lineal driving means to drive in the forward direction. This button was depressed, or a similar control is arranged to remove all overrides from the system and to precondition the logic circuit to retrieve from the left or right side of the unit. Operation of the lineal drive mechanism in the forward direction will cause the carrier member 9 to travel towards the exit point A2 along track 7. The state of reed switch contacts T1, T2, and $V_1$, $V_2$, will indicate whether either location is empty and will determine whether or not an empty pallet is withdrawn therefrom. If the logic circuit recognises that, for instance, location 1 has the first available empty pallet, the lineal drive mechanism will be halted with the carrier member opposite location 1 in response to a signal from the logic circuit determined by the state of contacts T1 and V1. The logic circuit recognises the prevailing conditions and a signal is generated to initiate operation of the transverse drive motor 32 on the carrier member 9 in one direction or the other according to whether a loading or unloading operation is to be performed. With operation of the transverse drive motor 32, an empty pallet 8 will be withdrawn from storage location 1 and transferred to the carrier member 9 by engagement of a driving pin 33 or 34 in the channel 19 of the empty pallet and the transverse movement of the pallet will be arrested by engagement of the skirt with an upstanding projection on the carrier member. A signal indicative of the arrival of the pallet 8 on the carrier member 9 is generated in response to actuation of the reed switch contacts $C_L$ by the magnet M1 on the pallet. In all operations, the inbuilt basic logic of the logic circuit determines the direction of movement of the carrier member 9 or pallets 8. Thus, when reed switch contact $T_1$ has been actuated in response to the absence of a pallet in location 1, i.e., the removal of magnet M1 actuates the contact $T_1$ and contacts $V_1$ are in a state of indicative of the absence of a vehicle in storage location 1, and contacts $C_L$ have been actuated by the presence of the pallet on carrier member 9, the logic circuit has all the information necessary to indicate that location 1 is empty and that the pallet has arrived on carrier member 9. A signal is then generated to effect switching off of the transverse drive motor 32 and to switch on the lineal drive motor to run in the reverse direction to return the carrier member 9 to the loading position A1 carrying with it the empty pallet obtained from storage location 1. The arrival of the carrier member 9 at position A1 causes reed switch contact A to be actuated by magnet M2 on the carrier member to indicate to the logic circuit that the carrier has in fact arrived at the entrance point and is at the rest position.

For the storage of a vehicle in storage location 1, the vehicle is driven on to the empty pallet 8 and actuation of a control button causes the lineal drive mechanism to be energized to propel the carrier member towards exit area A2 by means of the engagement of the driving pins on the chains in the channel members on the carrier member. As the carrier member 9 progresses along the track 7, the magnet M2 causes actuation of the contacts of reed switch element $L_1$. If actuation of $L_1$ coincides with a particular state of contacts $T_1$ or $T_2$ indicative that storage location 1 or 2 is empty, then the lineal motor is cut-off and the carrier stops opposite location 1 ready to effect the transfer of the pallet and vehicle to storage location 1; the direction of movement left or right of the pallet, i.e., to location 1 or location 2 being determined by whether contacts $C_L$ or $C_R$ is closed by the proximity of magnet M1 on the pallet. The combination of contacts $T_1$ open, $V_1$ open, $L_1$ actuated and $C_L$ closed, informs the logic circuit that storage location 1 is the first available empty storage location. A signal is thus generated to effect energisation of transverse motor 32 to transfer the pallet 8 and vehicle, from the carrier member 9 to storage location 1. As soon as the pallet has been returned to location 1, contact $T_1$, closes in response to the proximity of magnet M1 on the pallet and contact $V_1$ is closed in response to the sensing of an obstruction in storage location 1 viz. a vehicle. After a small time delay, the transverse drive motor is cut-off and the lineal motor is re-energized to run in the reverse direction to return the carrier member 9 to the entrance point A1 where reed switch contact A is closed and the carrier member restored to the rest condition.

In order to collect a vehicle from a selected storage location, e.g., location 1 and deliver the same to delivery point A2, the process is repeated as described, i.e., as the carrier member passes storage location 1, contact $L_1$ is actuated and the logic circuit recognises by the states of contacts $C_L$, $T_1$ and $V_1$ that the location 1 is full. The lineal power is removed and transverse power turned on to transfer a pallet and vehicle on to the carrier member. The contacts $T_1$ and $V_1$ change their states as also does contact member $C_L$ in response to the influence of magnet M1 on the pallet. The logic circuit recognises this particular combination and instead of generating a signal to reverse the lineal driving motor, the motor is energized to continue running in the same direction, i.e., in a forward direction. As the carrier member continues to travel along track 7, the contacts $L_2$ and $L_3$ are actuated in turn by magnet M2 on the carrier member but since no locations are vacant, the carrier member 9 continues to delivery point A2 where magnet M2 effects operation of contacts E to stop the lineal drive motor and condition it ready for a return journey of the carrier member in the reverse direction. The vehicle is driven from the pallet and the system remains in a rest condition.

In order to return the pallet to location 1, the control button is depressed to start the lineal drive motor which has been preconditioned to drive in the reverse direction and the logic circuit in effect seeks an empty location where a T reed contact is open viz. $T_1$ of location 1. As soon as the carrier member arrives opposite location 1 the state of contacts $L_1$, $T_1$ and $V_1$ and contacts $C_L$ indicates to the logic circuit that location 1 is empty. The lineal drive is interrupted, the transverse drive is started and the pallet 8 is returned to location 1. The logic built into the system determines that when the carrier member 9 delivers a pallet to an empty storage location during a travel in the reverse direction along track 7, the lineal drive is not reversed on delivery of the pallet to the empty location, but continues to run in the same direction to return the carrier member to entrance area A1.

The logic circuit is designed to meet the requirement of the system in accordance with the following Boolean equations:

$$P_{T1} = (\bar{R}_R + C_L) [\bar{C}_R \bar{C}_L (L_1' + L_2' + L_3') + \bar{R} L_1(T_1 + T_2) + \bar{R}L_2 (T_3 + T_4) + RL_3 (T_5 + T_6)]$$

$$P_{T2} = (\bar{R}_L + C_R) [\bar{C}_R \bar{C}_L (L_1' + L_2' + L_3') + \bar{R}L_1(T_1 + T_2) + \bar{R}L_2(T_3 + T_4) + RL_3(T_5 + T_6)]$$

$$P_{L1} = A[R \cdot + \bar{R} \cdot + \bar{P}_{T1} \cdot + \bar{P}_{T2} \cdot ][\overline{P_{T1} \cdot + P_{T2} \cdot + E \cdot + \bar{A} \cdot}]$$

$$P_{L2} = [E + \bar{V}(P_{T1} + P_{T2})][R \cdot + \bar{R} \cdot + \bar{P}_{T1} + \bar{P}_{T2}.][\overline{P_{T1} \cdot + P_{T2} \cdot + E + A}]$$

where $P_{T1}$ = Transverse power (forward)
$P_{T2}$ = Reverse transverse power
$P_{L1}$ = Lineal power (forward)
$P_{L2}$ = Reverse lineal power
$R_L$ = No 'left' selections
$R_R$ = No 'right' selections
$R = R_L R_R$ and the terms $T_1$ to $T_6$, $L_1$ to $L_3$, $E$ and $A$ refer to the reed switch contacts previously referred to $L' = L$ after selection.

Although the lineal driving means has been referred to previously as comprising a pair of driving chains 37, 38 located in the well 7 together with a pair of driven chain wheels 39,40, and a pair of idler chain wheels 41,42, it will be appreciated that if necessary, the idler wheels may be dispensed with. Furthermore, the lineal driving means may impart intermittent or continuous motion to the carrier member by providing a single pin or a pair of pins respectively on a driving chain. With a single pin as the pin progresses from one end of the chain to the opposite end, i.e., through one half cycle of chain movement, the single pin enters one end of one channel on the carrier member to move the carrier member from one storage location to another; the distance moved being equivalent to the length of the carrier member. As the pin continues to move with the chain, it will ride out of the same end of the said one channel on the carrier member and travel a further half cycle at the end of which, the single pin will enter the other channel of the carrier member. During this second half cycle, the carrier member remains stationary but at the end of the second half cycle, the single pin is in a position to push the carrier member to the next storage location. If continuous motion of the carrier member is required, two driving pins are provided at opposite points of the driving chain such that whilst one pin is leaving a channel of the carrier member to pass through its 'dwell' or 'non-driving' half cycle, the second pin is entering the other channel of the carrier member to continue the motion initially imparted to the carrier member by the first pin. The movement is continuous or virtually so, apart from a slight 'dwell' period during the change-over from one pin to the other, brought about by flaring of the channel to act as a 'lead in' for the pin. The 'dwell' period can be varied by reducing the 'lead in' portion of each channel.

Referring now to FIGS. 12 to 14 of the drawings, a ten vehicle storage and retrieval unit is shown although it will be appreciated that in practice, the unit would accommodate considerably in excess of ten vehicles on one level. The unit includes the ten vehicle storage locations 1 to 10 arranged in two rows on either side of the central aisle 111. A wheeled pallet 112 is arranged in each storage location and a carrier member 113 is arranged to run between guide rails 114 provided in the sunken well or track 111 beween an entrance point A1 and a point A2, at the other end of the track 111.

Each pallet 112 comprises a flat surface of sheet metal or the like which is stepped as shown at 115,116 to guide the wheels 117 of a vehicle 118, but it will be appreciated that the pallets 112 may be of any suitable construction and may be constructed as shown and described in U.S. Pat. No. 3,554,389. A plurality of pairs of wheels 119 are provided for each pallet 112 and are arranged to run on parallel rails 120,121, provided in each storage location and on parallel rails 122,123 provided on the carrier member 113.

The carrier member 113 is arranged to run along the track 111 in the direction of arrows X in FIGS. 12 and 13 and in the opposite direction and on wheels 124, 125 running on the rails 114. The surface 126 of the carrier member 113 is arranged to lie substantially flush with the surfaces of the storage locations 1 to 10 with the rails 122,123 on the carrier member at the same level as the rails 120,121 of each storage location and such as to be aligned therewith whenever the carrier member is located opposite the respective storage location. The transverse driving means mounted on the carrier member 113 comprises an endless chain 127 driven from a chain wheel 128 and passing around an idler chain 129 and driven by an electric motor (not shown) mounted on the carrier member 113. The chain 127 is provided with a peg or pin 130 which is arranged to engage in channels 131,132, projecting from the ends of the pallets 112, and to pass along the channels in order to move the pallets from or to a storage location to or from respectively the central aisle 111. As shown in FIG. 12, the surface of the carrier member 113 is stepped to provide a compartment 133 along one side of the carrier member to accommodate one pair of wheels 124, and a compartment 134 being provided along the other side of the carrier member to accommodate the other pair of wheels 125, to accommodate any auxiliary mechanism carried by the carrier member such as an electric motor for driving the transverse driving means, and providing a platform 135 to allow passengers or the driver to leave or enter a vehicle whilst it is located on a pallet 112 on the carrier member 113. If required, the platform 135 may be provided on both sides of the carrier member.

The lineal driving means for driving the carrier member 113 in either direction along the track 111 comprises a pair of contra-rotating arms or vanes 136,137, each mounted on a central spindle 138,139 respectively. The arms or vanes 136,137 are mounted for rotation underneath the carrier member 113 and each arm or vane is provided with a pair of depending pins, rollers or pegs 140,141 arranged to engage in two rows of channels 142 provided on or in the floor of the track 111 in order to propel the carrier member 113 along the track. As shown in FIG. 13, the arms or vanes 136,137 are so arranged and the channels 142 so spaced that when the vanes are rotated by driving means (not shown) mounted on the carrier member 113, one of the pins 141 in each vane will enter a channel 142 pulling the carrier member 113 along the track. When a pin has traversed the respective channel, the other pin at the opposite end of the vane is ready to enter the next channel in the track and in this manner the carrier member 113 is propelled along the track 111.

The channels 142 may be placed on top of the floor surface and joined together in 'ladder' fashion for stability. Alternatively, metal strips may be inlaid in the floor with gaps in between to simulate channels.

In practice, the carrier member is approximately 10 feet in width carrying pallets which are approximately 7 feet in width. The extra width allows vehicles to drive on from the side of the storage unit as depicted by arrow P in FIG. 13 and allow sufficient room for any passengers and the driver to alight before the vehicle is conveyed down the track 111 to an empty storage location by movement of the carrier 113 and pallet 112 in the direction of arrow X in a sideways and 'crablike' manner. At an empty storage location, the lineal movement of the carrier and pallet under control of the lineal driving mechanism, is halted and the transverse driving mechanism actuated to transfer the pallet and vehicle to the storage location.

For retrieval purposes, the operation is reversed and the transverse driving mechanism on the carrier is actuated to withdraw a vehicle and pallet from a selected storage location and convey them to point A1 (FIG. 13) where the extra width of the carrier member allows the driver and any passengers to embark and the vehicle is driven off the pallet in the direction of arrow Q.

The automated operation of the storage unit, i.e., the movement of the carrier member and the movement of any pallet may be controlled by the logic circuitry previously described with reference to the arrangements of FIGS. 1 to 11. One or more rotary arms or vanes may be provided on the carrier member to effect lineal driving thereof, and the vanes may extend across the whole or only part of the width of the carrier member. Furthermore, although electric motors have been referred to in connection with the transverse and lineal drive mechanism, hydraulic drive mechanism may be substituted if required for either or both, and the logic circuitry may be electrical, electronic or of the fluid logic type and the logic circuitry, driving means and ancillary equipment may all be mounted on the carrier member to effect a saving in space and a substantial saving in the number of components used. In addition to or in lieu of the electric motors for the lineal and/or transverse driving mechanism, compressed air may be used for the driving means or the driven elements of the system may be conveyed from one location to another by means operating in accordance with air cushion principles of support and motivation.

The car storage and retrievel system of the present invention may be of single or multistorey construction. Where multistorage systems are contemplated, hoists or elevators may be used to convey vehicles from ground level to a remote storage location at a higher level or the system. Alternatively, ramps may be used instead of hoists or elevators. Preferably a pair of ramps is provided at each level and there are arranged on opposite sides of the floor surface for adjacent levels. An 'up' ramp and a 'down' ramp are provided at each level and adjoin each other in a 'criss-cross' or 'scissors' fashion. Only one entrance and one exit route are provided at each level communicating with the aisle or track for the carrier member.

A further embodiment of the invention will now be described with reference to FIGS. 15, 16 and 17 of the drawings. The arrangement shown in FIG. 17 is ideal for a warehousing system where the goods are stored at random and the loads are not required in any particular sequence. The system includes ten rows of storage locations served by top and bottom aisles or tracks E and F respectively. Each row contains 20 storage locations for pallets or loads of any kind, but it will be appreciated that the number of rows and the number of storage locations within each row can be varied according to requirements, and the number of storage locations in each row will be determined by the power available on the carrier members in the aisles or tracks. Two loading bays A and B are provided arranged to be fed by any suitable means such as a forklift truck, stacker-crane or other device and drawing from a stack of empty pallets. The pallets may be provided with wheels or castors and with or without a centering device. The carrier member C,D in each aisle or track is arranged to receive one or more pallets on portion D; the pallet being moved transversely by means of the interlinked coupling devices described in U.S. Pat. No. 3,554,389, which permit coupling in one direction and uncoupling in a direction normal to the coupling direction. Portion D of the carrier member is provided with mechanism for effecting a transverse movement of the pallets to or from the storage locations from or to respectively the carrier member, and the pallets carry loads forklifted or otherwise conveyed thereto. Portion C of the carrier member C,D carries mechanism for effecting lineal movement of the carrier member and associated pallet. Such lineal motion mechanism may be as described in copending Application Ser. No. 718,049 or as described hereinbefore. The mechanism is arranged clear of the pallet area on the carrier member and the size of the area is sufficient to mount thereon an electric motor of sufficient power to move the required number of pallets when loaded.

The row marked G is a row of empty storage locations (although in practice more than one row may be left empty) into which pallets may be stored temporarily whilst one or more particular pallets are selected from storage and moved transversely to the carrier members C,D and aisles or tracks E or F.

Each row of storage locations is provided with means for centering the pallets, which centering means may comprise U- or V- shaped rails for supporting complementary shaped wheels, or any other centering means may be provided. If it is assumed that the size of each pallet is 4 feet by 4 feet, and pallets are loaded on to carrier members on aisles E and F simultaneously, then the distance travelled by the transverse driving mechanism will be 8 feet per pallet to traverse in one direction and return. Thus, for each row of 10 pallets, the distance travelled will be 80 feet and for 10 rows, the distance travelled will be 800 feet. If the speed of travel is assumed to be 5 feet per second, the total time of travel is 160 seconds. For the lineal driving mechanism, pallets numbers 1 to 10 on both sides will always be in position for row 1, row 2 would require movement of 8 feet per pallet which is 80 feet per row of 10 pallets.

For ten rows, the movement would be 3,600 feet. At a speed of 10 feet per second, the total time to move all pallets in a lineal direction would be 360 seconds. Thus, the total time to move the pallets transversely and linearly would be 520 seconds or 8.66 minutes for 200 pallets each measuring 4 feet by 4 feet, i.e., slightly less than 1,400 pallets per hour.

Referring now to FIGS. 15 and 16 of the drawings, the carrier member C,D is shown in position on a track H opposite the first storage location of row 1. The transverse driving mechanism may be as described hereinbefore comprising a pair of endless chains 150,151 mounted on the carrier member C,D and driven from a respective driven chain wheel 152,153 and passing around a respective idler wheel 154,155; the driven chain wheels 152,153 being arranged to be rotatably driven by means of an electric motor (not shown) mounted on part C of the carrier member C,D. Each chain 150,151 is provided with a respective peg or pin 156,157 which are arranged to pass through gaps 158 in a skirt 159 of a pallet 160 and to pass along the channel thereof in order to move the pallet in a transverse direction.

The method for coupling the carrier member and pallets to effect transverse movement is as described in U.S. Pat. No. 3,554,389, in which channel section members 161 on the carrier member C,D engage with complementary shaped section members on the pallets to couple the carrier member to the pallets for transverse movement of the pallets, and uncouple the pallets from the carrier member when the latter is moved in a direction normal to said transverse direction. Each pallet 160 is provided with wheels 162 and has a male coupling at one end and a female coupling at the other end.

The lineal drive mechanism comprises a plurality of spaced channels ('ladder rack') — the channels being spaced apart a distance equivalent to the width of a pallet. The express carrier C,D is of virtually identical structure to that described previously with reference to FIGS. 12 to 14 but using chains and chain wheels instead of the rotatable vanes and with a roller or rollers on each chain arranged to engage in the channels of a vertical 'ladder rack'.

As shown in FIGS. 16 and 18, the 'ladder racks' consist of a plurality of equispaced vertical channels 163 provided in the vertical wall 164,165 of the track H along which the carrier member C,D (FIGS. 15, 16) is propelled. The channels 163, are open at one end and the open end flared or otherwise shaped to provide a 'lead in' for the rollers 166 on the chains 167 of the lineal drive mechanism thereby facilitating entry thereof. The channels 163 are spaced apart at a distance equivalent to the width of the pallet 160.

Referring to FIGS. 16 and 19, the carrier member C,D is provided along each side with a chain 167 rotatable on chain wheels 168,169,170,171, and extending along a portion of the length of the carrier member C,D equivalent to the width of a pallet 160. The chains 167 are each provided with a pair of rollers 166, arranged to engage in the vertical channels 163 of the 'ladder rack' as shown in FIG. 15.

As shown in FIG. 16, the pallets 160 may be provided with an additional wood/metal pallet 172 arranged such as to be handled by a forklift or any other assembly (not shown) and the pallet 172 may be loaded from an end or from a side of the wheeled pallet 160 since there are no obstructions. The wheels of the carrier members are shown at 173,174 and a centering rail 175 is provided and arranged to cooperate with centre wheels 176 on the carrier member C,D. The space C accommodates the motors and gearboxes for the lineal and transverse driving mechanisms.

Although the 'ladder racks' have been described as located on the vertical walls of the track H, they may be provided on the carrier member and the chains and rollers of the lineal driving mechanism provided on the side of the track or on the track itself.

Similarly, whilst the carrier members, pallets and like containers have been described as mounted on wheels and the pallets moved in a lineal and transverse direction by means of the carrier member, the pallets or like containers may be provided with ball transfer units in which case it is not necessary for the pallets to be carried in pick-a-back fashion on the carrier member as described for instance in the copending application Ser. No. 718,049, but the pallets may move in a lineal or transverse direction along an aisle or track on their own without the carrier member. Thus, the carrier members can be dispensed with and the pallets provided with stationary, rotary, lineal and transverse drive mechanism for cooperation with rotary or stationary channel members respectively on the track.

The channels may be provided on a movable platform mounted on balls engaging in a track. Such a platform is shown in FIG. 20 which is a perspective view of a "skeleton" platform with the channels or stationary portions of the transverse and lineal driving mechanisms located on the sides of the platform and the rotary or moving members provided on the track but not shown in FIG. 20. The rotary means may comprise chains and associated chain wheels with pins, pegs or rollers engaging in the channels to effect transverse and/or lineal movement of the platform or the moving means may comprise the rotary vanes and associated rollers as hereinbefore described. Thus, referring to FIG. 20, the platform 200 is of skeleton form constructed from girders of solid or hollow section. A pair of vertical channels 201,202 are mounted on both sides of the platform 200 for the lineal drive mechanism and a pair of channels 203,204 are provided at each end of the platform for the transverse drive mechanism. As with previously described arrangements, coupling channels 205,206 are provided along each top edge of the platform for coupling engagement in one direction of travel with complementary shaped channels on another platform or container and for uncoupling when moved in a direction transverse to the direction of coupling. Similar coupling members 207,208 are provided at each end of the carrier member 200; coupling 207 being of male configuration and coupling 208 being of female type. The chains and chain wheels with associated rollers, pegs or pins for the transverse and lineal drives are located on the track but shown in dotted lines in FIG. 20 at 209,210, respectively. The ball units of the platform and the track in which the balls are arranged to run have been omitted in FIG. 20 for the sake of clarity. However, it will be appreciated that any conventional type of ball track may be used with junctions where it is required to change the direction of travel of the vehicle or platform.

The platform 200 may serve as a vehicle for a pallet provided with wheels or with ball units running in tracks with or without centering means.

From the above description it will be seen that the lineal drive mechanism comprises channel members and rotary members and may be arranged with the channel members stationary and the rotary members mounted on the vehicle such as the carrier member or vice versa for horizontal movement along a track and similarly the transverse drive mechanism comprises channel members and rotary members and may be arranged with the channel members stationary and the rotary members mounted on the track or vice versa. However, the channel members may be provided on a vertical surface adjacent the vehicle such as the carrier member, with the rotary means carried by the vehicle or vice versa to effect movement of the vehicle in a horizontal or vertical plane by engagement of the rollers or the like of the rotary means in the channel members. This enables the invention to be used in connection with a hoist or elevator/lowerator mechanism such that a multi-level system for the storage and retrieval of loads can be provided.

Thus, referring to FIG. 21, there is shown a cage 211 of a hoist having the form of a two sided 'box' with supporting cross members at the top and a floor at the bottom of the cage. The sides 212,213 are of sufficient thickness to allow grooves or channels 214,215 to be formed therein to receive the rollers 216,217 of chains 218,219. Alternatively, the channels may be mounted on the sides 212,213, in any convenient manner. The well 220 for the hoist is shown in FIG. 22 in which a plurality of chains 218 are provided in a side of the well, each chain being provided with a pair of rollers 216, 217. Chains are also provided on the opposite side of the well but are not shown for the sake of clarity. It will be appreciated from the foregoing that rotary means such as rotatable vanes may be used instead of the chains 218,219, and the channels may be provided in opposite walls of the well 220 and the rotary means such as the chains or vanes provided on the cage 211 or vice versa.

In another embodiment of the invention applicable to the carriage of vehicles, goods or pedestrians, a track or expressway is completely filled with vehicles such as pallets each provided with channels or grooves or 'ladder racks' at each side and at each end. Preferably the pallets are arranged in two parallel rows and along each side of the track and at both ends thereof, driving means are provided with means arranged to engage with the grooves or 'ladder racks' such as to impel the pallets in a desired direction. The driving means may comprise chains with rollers, pegs or pins or the like or vanes and associated rollers as described above. Where chains are used, there preferably have two rollers or pegs per chain.

The continuous lines of pallets would carry pedestrians, goods or vehicles and if simultaneous movement is required in both rows of pallets in opposite directions, then the lineal mechanism would have some form of vertical guard on each side of the two lines of pallets. Alternatively, one side would be covered or masked, but both ends could be covered or masked in any case, especially if pedestrians are transported and were able to walk off the line of pallets. The lines of pallets could be horizontal or inclined at a slight angle, either in an ascending or descending manner at one or both ends or for the entire length.

Although in the foregoing embodiments, the storage locations have been described as adjacent an aisle or track requiring a carrier member or the like to run along the track to withdraw any selected pallet from, or insert any particular pallet into storage, it will be appreciated that the driving mechanism of the present invention may be used to impart motion to a vehicle for any purpose whatsoever. Thus containers located on flat bed railway wagons may be off loaded on to a truck or like road vehicle by the mechanism of the present invention; the container having channels arranged to be engaged by a pin, peg or rollers on rotary means such as a chain drive such as to move the container from the wagon to the road vehicle or vice versa. Similarly, a truck or similar road vehicle may be used to unload or load containers at a docks or like goods handling terminal.

From the foregoing it will be seen that the pin, peg or roller on a rotatable member such as a chain for engagement in a channel, provides a positive driving means for a vehicle which can be used to stop a vehicle with extreme accuracy at any point during its traverse along a track and is particularly effective to stop a carrier member, pallet, container or like movable member with precision opposite any particular storage location of a goods storage and retrieval system without hunting and despite the load carried by the movable member, and the accuracy of location is not dependent on the tension applied to the chain, i.e., the movable member may be positioned accurately whether tension is applied to the chain drive or whether the chain is slack. The arrangement of chain, projection and channel allows the movable member to automatically slow down for each storage location and this helps to overcome the momentum and can be assisted by a braking motor or the like. The distance between the centres of the chain wheels or sprockets determines the distance travelled by the movable member with absolute precision.

Where a 'dwell' period is present with the chain drive of the lineal driving mechanism, this can be used to effect any transverse movement of a pallet or like container whilst the movable member such as the carrier member is stationary during the 'dwell' period.

I claim:

1. Load storage apparatus having a plurality of load storage locations arranged in substantially horizontally co-planar parallel storage aisles extending at right angles from a service aisle, a carriageway in said service aisle extending from a loading and unloading location past each of said storage aisles; a carriage in said carriageway adapted to be moved therealong; a load supporting platform for each of said storage locations in said storage aisles, said load supporting platforms being of uniform size and being adapted for movement along said storage aisles and having driven channel elements adapted to cooperate with drive means on said carriage; carrying means on said carriage adapted to carry one said load supporting platform and to receive or deliver such loading platform from or to any selected one of said storage aisles or said loading or unloading location, first drive means for driving said carriage along said carriageway, said first drive means comprising means on said carriage for driving at least one pusher means along a closed locus with respect to said carriage, said locus having a forward and rearward dead centre position at which the tangent thereto is at right angles to the direction of said carriageway, said forward and said rearward dead centre positions being spaced apart a distance equal to the distance between the centres of two adjacent storage aisles, a plurality of spaced apart channel members adapted to cooperate in driven relationship with said pusher means providing channels fixed in relation in said carriageway at right angles thereto, each said channel member being so positioned as to provide said driven relationship only during movement of said pusher means along said locus between said forward and said rearward dead centre positions on one side thereof but to be free of such engagement during movement of said pusher means along said locus between said forward and rearward dead centre positions on the other side thereof, the positions of said channel members in relation to said carriageway being such as to correspond, when a pusher member in engagement therewith is at one of said dead centre positions, with a position of registry of said carriage with one of said storage aisles or said loading and unloading location whereby continuous operation of said drive means moves said carriage along said service aisle in a manner providing a plurality of automatic dwell positions in the course of such movement as said carriage comes into a position of registry with each of said storage aisles and said loading and unloading location; second drive means mounted on said carriage and comprising second pusher means adapted to cooperate in driving relationship with said driven channel elements on said load carrying platforms to move a load carrying platform carried by said carrying means on said carriage into an adjacent load storage location in a storage aisle with which said carriage is in registry or to move a load carrying platform in such position onto said carrying means on said carriage when the latter is empty; control means for said first drive means whereby said first drive means may be caused to move to and stop at any of said automatic dwell positions corresponding to registry of said carriage with any selected one of said storage aisles or said loading and unloading location; and control means for said second drive means whereby when said carriage is stopped at any of said automatic dwell positions said second drive means may be actuated to move a load carrying platform into or out of said load carrying means on said carriage into or out of a storage aisle with which said carriage is in register or into or out of said loading and unloading location if said carriage is in registry therewith.

2. Storage apparatus as claimed in claim 1 wherein each load carrying platform is provided with coupling means adapted to couple a load carrying platform carried by said carriage with a load carrying platform in an adjacent storage location within a storage aisle as said carriage moves into registry with such storage aisle and to uncouple a load supporting platform carried by said carriage from a load supporting platform in an adjacent load storage location in a storage aisle with which said carriage has been in register as said carriage moves out of register therewith, whereby all load supporting platforms in any given storage aisle are coupled together train fashion while they remain in such storage aisle.

3. Storage apparatus as claimed in claim 2 in which there is at least one additional storage aisle in respect to the storage locations of which there are no loading supporting platforms.

* * * * *